United States Patent
Pennington et al.

(10) Patent No.: US 8,925,051 B1
(45) Date of Patent: *Dec. 30, 2014

(54) AUTOMATED LOGIN SESSION EXTENDER FOR USE IN SECURITY ANALYSIS SYSTEMS

(71) Applicant: WhiteHat Security, Inc., Santa Clara, CA (US)

(72) Inventors: William Pennington, San Jose, CA (US); Jeremiah Grossman, San Jose, CA (US); Robert Stone, Mountain View, CA (US); Siamak Pazirandeh, Santa Clara, CA (US)

(73) Assignee: WhiteHat Security, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/681,759

(22) Filed: Nov. 20, 2012

Related U.S. Application Data

(60) Continuation of application No. 12/267,235, filed on Nov. 7, 2008, now Pat. No. 8,341,711, which is a division of application No. 11/210,351, filed on Aug. 23, 2005, now Pat. No. 7,467,402.

(60) Provisional application No. 60/604,313, filed on Aug. 24, 2004.

(51) Int. Cl.
*H04L 29/06* (2006.01)

(52) U.S. Cl.
CPC .............................. *H04L 63/1483* (2013.01)
USPC ............................................................ 726/5

(58) Field of Classification Search
CPC ........................................................ H04L 63/12
USPC ............................................................. 726/5
See application file for complete search history.

(56) References Cited

U.S. PATENT DOCUMENTS

| | | | |
|---|---|---|---|
| 7,467,402 B2 | 12/2008 | Pennington et al. | |
| 2002/0062342 A1 | 5/2002 | Sidles | |
| 2002/0078087 A1 | 6/2002 | Stone | |
| 2002/0099599 A1 | 7/2002 | Minassian | |
| 2003/0074448 A1* | 4/2003 | Kinebuchi et al. | 709/225 |
| 2003/0110266 A1* | 6/2003 | Rollins et al. | 709/227 |
| 2004/0158746 A1 | 8/2004 | Hu et al. | |
| 2006/0048214 A1 | 3/2006 | Pennington et al. | |

OTHER PUBLICATIONS

International Serach Report and Written Oppinion for PCT/US2005/30333 dated Sep. 18, 2007 (13 Pages).

* cited by examiner

*Primary Examiner* — Jason K Gee
(74) *Attorney, Agent, or Firm* — Davis Wright Tremaine LLP; Philip H. Albert

(57) ABSTRACT

A web application security scanner (WASS) includes a login manager configured to perform an automated login to a web site. The automated login may be performed when the login manager detects that a login session has ended. The login manager is configured to determine credentials for the web site to allow the WASS to access the web site. The WASS may then use the credentials to continue scanning the web site. Thus, previously unscannable web pages may be accessed in the web site because of the automated login process.

7 Claims, 6 Drawing Sheets

AUTOMATED LOGIN SESSION EXTENDER FOR USE IN SECURITY ANALYSIS SYSTEMS

CROSS-REFERENCE TO RELATED APPLICATIONS

This application is a continuation application of U.S. application Ser. No. 12/267,235, filed Nov. 7, 2008, which is a divisional application of U.S. patent application Ser. No. 11/210,351, filed Aug. 23, 2005, which claims priority from U.S. Provisional Patent Application No. 60/604,313, filed Aug. 24, 2004, entitled "Automated Login Session Extender for Use In Security Analysis Systems", which is hereby incorporated by reference, as if set forth in full in this document, for all purposes.

BACKGROUND OF THE INVENTION

Embodiments of the present invention generally relate to web application security scanners and more specifically to web application security scanners capable of detecting session state and capable of automatically logging into a web site.

Web application security is important for businesses that maintain web sites. Unauthorized access to a web site may allow user identities to be stolen, allow personal user information to be accessed without authorization, etc. This may cause many problems for businesses. Also, unauthorized attacks may affect a web site's availability.

In order to protect against unauthorized access, a security analysis of the web site may be performed. This may include scanning the web site to determine any vulnerabilities that may exist. The scanning typically ignores significant aspects of the web site functionality. For example, the scanner may not be allowed to access certain areas of the site if they are protected. Accordingly, the scanner may not be able to reliably test significant portions of the web site functionality. Thus, a security analysis may not be complete and reliable.

BRIEF SUMMARY OF THE INVENTION

Embodiments of the present invention relate to automated web application security scanners. In detail it is concerned with automated authentication credential management within the scanner.

In one embodiment, a method for managing session state during a security scan of a web site is provided. The method comprises: analyzing a first page received in response to a first request for the first page of the web site to determine if a session is valid; and if the session is not valid, performing the steps of: determining login information for the web site; causing a browser to send a second request for a login page of a web site; receiving the login page in response to the second request for the login page of the web site; causing the browser to send a third request including the login information for the web site, the request for logging into the web site; and receiving a response for the third request, the response including credential information, the credential information useable to establish a valid session with the web site.

In another embodiment, a method for determining session state during a security scan of a web site is provided, the method comprises: generating a model for use in determining if a response for a session verification request indicates a session is valid or invalid; sending the session verification request including credential information, wherein it is not known if the credential information is valid or invalid; receiving a page for the web site in response to the request; analyzing the page based on the model to determine a model page that yields a nearest match to the page; and determining whether the credential information is associated with a valid or invalid session based on the model page determined.

In yet another embodiment, a system for managing session state during a security scan of a web site is provided. The system comprises: a web application security scanner configured to scan one or more pages for a web site; and a login manager configured to determine if a session is valid during the scan, the login manager comprising: a model for use in determining if a response for a session verification request indicates a session is valid or invalid; a login checker configured to send the session verification request including credential information, wherein it is not known if the credential information is valid or invalid; a response analyzer configured to: receive a page for the web site in response to the request; to analyze the page based on the model to determine a model page that yields a nearest match to the page; and determine whether the credential information is associated with a valid or invalid session based on the model page determined; a re-login manager configured to cause the web site to send valid credential information if the credential information is determined to be invalid.

A further understanding of the nature and the advantages of the inventions disclosed herein may be realized by reference of the remaining portions of the specification and the attached drawings.

DETAILED DESCRIPTION OF THE INVENTION

Overview of Security Scanners

Figure 1:
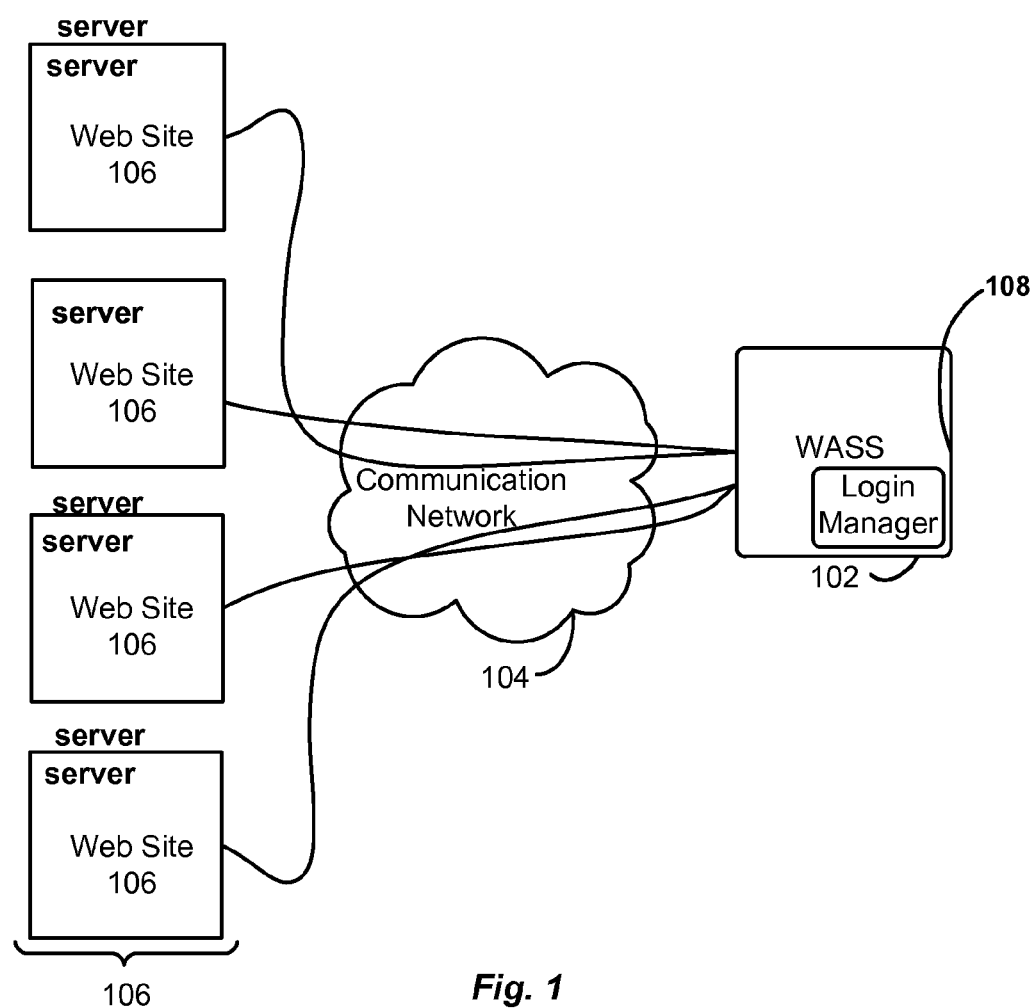
FIG. 1 depicts a system for scanning applications, such as web sites, according to one embodiment of the present invention.

FIG. 1 depicts a system 100 for scanning applications, such as web sites, according to one embodiment of the present invention. As shown, system 100 includes a web application security scanner (WASS), a communication network 104, and one or more web sites 106.

WASS 102 is configured to scan web sites 106 for security vulnerabilities. In one embodiment, the scan is performed on an application or at the application level. For example, in one embodiment, WASS 102 may scan application code for the web site 106. WASS may perform tests on the application code that will assess vulnerabilities. Any vulnerabilities found may be summarized and provided to a user in security assessment. A security scan may be very important because if there are web application vulnerabilities, attackers may gain access to personal information, such as user's credit card data and other personal information. This may enable fraud, identity thefts, etc. Accordingly, using WASS 102 to scan web sites 106 may detect certain vulnerabilities before attackers can exploit those vulnerabilities.

WASS 102 may interact with web sites 106 through communication network 104. Communication network 104 may be any network, such as the Internet, a local area network (LAN), a wide area network (WAN), a wireless network, a wire-line network, etc.

A web site 106 may be any application. Although a web site is described, it will be understood that any software application may be scanned. In one embodiment, web site 106 is a collection of files. For example, a web site 106 may include a beginning file called a home page. This home page may be associated with an identifier, such as a universal resource locator (URL), such as HTTP://www.homepage.com. The URL corresponds to a file that is being stored. From a home page, other pages may be accessed using links on the home page. The other pages may be associated with other URLs, such as www.homepage.com/login.html. A person of skill in the art will appreciate additional details regarding web sites that are not described. Although the terms web pages and web sites are used herein, it will be understood that these terms may include applications that are not web based.

The files for web site 106 may be stored on a storage device, such as a web server 108. A server 108 is a computer that holds the files for one or more web sites 106. In some cases, a web site 106 may be split over a number of servers 108 in different geographical locations.

When an identifier is requested for a page, a web server 108 may use a file stored on the server 108 in order to serve the web page to the requester. The web page may then be displayed on an interface, such as a web browser. Actions may then be performed with the web page. For example, items may be selected ("clicked") to request other web pages, text may be entered, etc. Requests indicating these actions may be sent to a web server 108 for further processing. For example, login information, such as a username and password, may be entered on a web page in order to login to a web site 106. In this case, a user may access a restricted web page that is only accessible if the login information is entered. For example, a restricted web page may show a user's personal bank account information.

A protocol may be used in communications between a browser and a server 108. In one embodiment, the HyperText Transfer Protocol (HTTP) is used. Using the example above, login information, such as a username and password, account number or related information, is entered in a web page sent in a request. The login information may be any information that allows access to restricted parts of web site 106. The login information sent in the request may allow a user to login into web site 106. In response to receiving the login information, credential information may be sent in a response from a server 108. Credential information may be any information that may be needed to access the restricted parts of web site 106. The credential information may be stored and sent with future requests by a client that sent the request. For example, HTTP cookies, URL parameter schemes, or other HTTP headers may be used to retain the credential information for future requests. Thus, a user does not need to continuously enter in the above login information to gain access to web site 106.

When a user logs in, a session is started with the client that sent the request. A session may be any time that the credentials may be used to access parts of web site 106. The credentials may become invalid, for example, by expiring, becoming spent, or by any other action (the session is affirmatively ended by a logout action). When credential are invalid, the session is ended (i.e., invalid). After the session is ended, the access that was provided using the credentials may be denied.

The protocol used to access web sites 106, such as HTTP, may be generally stateless and anonymous. Thus, WASS 102 may send requests when a session is invalid, which may not allow WASS 102 to access pages of web site 106. These requests may be marked and later on may be tried again with valid credentials without affecting the scan being performed by WASS 102. This is because HTTP is stateless and a valid request at a later time may be sufficient to test the page associated with the request.

Accordingly, WASS 102 may recover from invalid requests during a scan. WASS 102 includes a login manager 108 configured to perform an automated login to web site 106. The automated login may be performed when login manager 108 detects that a session has ended. As will be discussed in more detail below, login manager 108 is configured to determine credentials for web site 106 to allow WASS 102 to access web site 106. WASS 102 may then use the credentials to continue scanning web site 106. Thus, previously unscannable web pages may be accessed in web site 106 because of the automated login process.

Embodiments of the present invention provide login sequence recordation, session state detection, and automated login. Login sequence recordation includes the process of determining login information that allows login manager 108 to automatically login to web site 106. Session state detection includes a process to determine if credentials have been spent, expired, or otherwise invalid. If the session state is determined to be invalid, then credential information is determined using the login sequence that was recorded, and is used to automatically login to web site 106. This provides credential information that can be used by WASS 102 to access and scan web site 106.

Login Sequence Recordation

Figure 2:
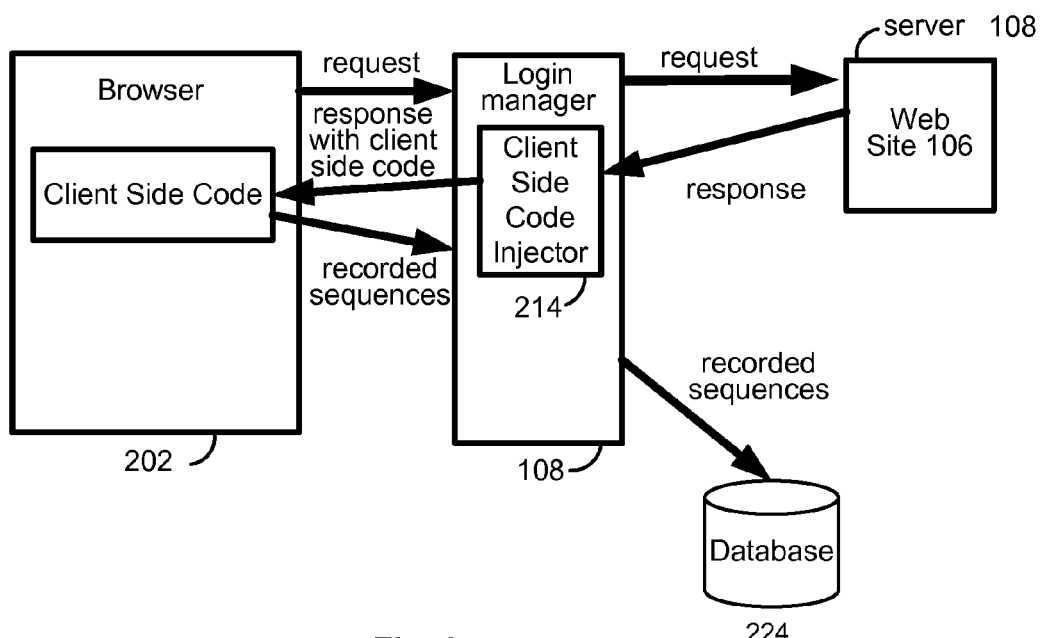
FIG. 2 depicts a system for recording a login sequence according to one embodiment of the present invention.

FIG. 2 depicts a system 200 for determining credential information according to one embodiment of the present invention. As shown, system 200 includes a browser 202, login manager 108, and a web site 106. Web site 106 may be a target web site that WASS 102 will be scanning.

Browser 202 may be any interface found on a client. For example, browser 202 may be any interface such as Netscape Navigator™, Mozilla™ Firefox™, Internet Explorer™, or any other application. A client may be any computing device, such as a personal computer, workstation, personal digital system (PDA), cellular phone, etc.

Login manager 108 may be part of WASS 102 or may be separate from WASS 102. Login manager 108 is configured to be a proxy that intercepts or receives traffic sent between browser 202 and web site 106. For example, browser 202 sends all traffic via login manager 108 to web site 106. Further, a server 108 for web site 106 responds to traffic from browser 202 by sending traffic through login manager 108 to browser 202.

In one embodiment, a series of transactions, such as HTTP transactions, are performed using browser 202. For example, browser 202 may request a web page from web site 106. The request is sent through login manager 108, which intercepts the request and then forwards the request to a server 108 for web site 106. The server 108 for web site 106 responds to the request with the web page. The web page is then intercepted by login manager 108.

A client-side code injector 214 is then configured to inject client-side code into the web page in the response. In one embodiment, the client-side code may be JavaScript code or any other client-side code, such as VBscript, etc. The web page may include any information, such as HTML code. In one embodiment, the client-side code is included into the HTML code. The modified web page is then sent to browser 202. The client-side code is configured to be executed on the client displaying the page in browser 202. The client-side code may be stored in memory at the client. The code is then executed. Although client-side code is described, it will be understood that code may be stored in other areas other than at the client.

Browser 202 may then display the web page and also load the client-side code. The client-side code is configured to record information at browser 202. For example, the client-side code records all events that occur with the web page being displayed in browser 202. In one example, requests sent by browser 202 to web site 106 and any details of the requests are recorded. Also, browser 202 may record other events, such as mouse clicks, keystrokes, or any other actions. The events that are recorded may include enough information such that login manager 108 is able to replay the events at a later time. For example, if the username and password are sent to web site 106, a username and password are recorded in addition to how the request was sent, such as which button was selected to send the request where the username and password are entered, etc.

In one embodiment, the events are recorded using a document object model (DOM) of the web page. Although a DOM is described, it will be understood that any model describing the structure of the web page may be used. The client-side code records the document object model events. The recorded events are described with reference to the structure of the page. For example, the mouse clicks and keystrokes are recorded at a certain point in the web page using the DOM model. The recorded sequence may say a click was performed at this coordinate of the page for this element.

When the sequences have been recorded by the client-side code, they are sent to login manager 108, which then can forward the recorded events to a database 224. Login manager 108 may then use the recorded events as will be described later to automatically login to web site 106. The recorded events may be sent as each event occurs, at certain intervals, when certain actions take place, or at any other time.

If multiple web pages are being requested by browser 202, login manager 108 may insert client-side code into each web page as they pass through it. In one embodiment, every web page sent through login manager 108 is issued a sequence number and modified to include client-side code. All the events for each web page are then recorded by the code and sent to database 224. These events may be recorded and stored with the sequence number assigned to each web page. Accordingly, when an event needs to be replayed from a web page, the sequence number may be used to determine which recorded sequences should be replayed for which events.

In one embodiment, a series of HTTP transactions (a recorded sequence) is performed by browser 202. The HTTP transactions authenticate a user with web site 106 and may include requesting a web page from web site 106, entering in login information, such as a username/password, and sending a request with the login information. The login information may then successfully login to a web site 106.

In one embodiment, login manager 108 records the sequence using a standard web browser. Login manager 108 may manipulate the passing HTTP requests and responses in order to record sequences during the login process using the standard web browser. This may be important because developers may be reluctant to change a user interface to a web site. Recording a process the user applies to provide login information is less subject to change than the HTTP request from a web browser or TCP traffic from a client computer.

Session State Detection and Automated Login

WASS 102 may perform a scan on web site 106 after a sequence of events have been recorded as described in FIG. 2. While scanning, WASS 102 may want to determine if a session is still valid. If a session is not valid, login manager 108 is configured to automatically re-login using the recorded sequences stored in database 224.

Figure 3:
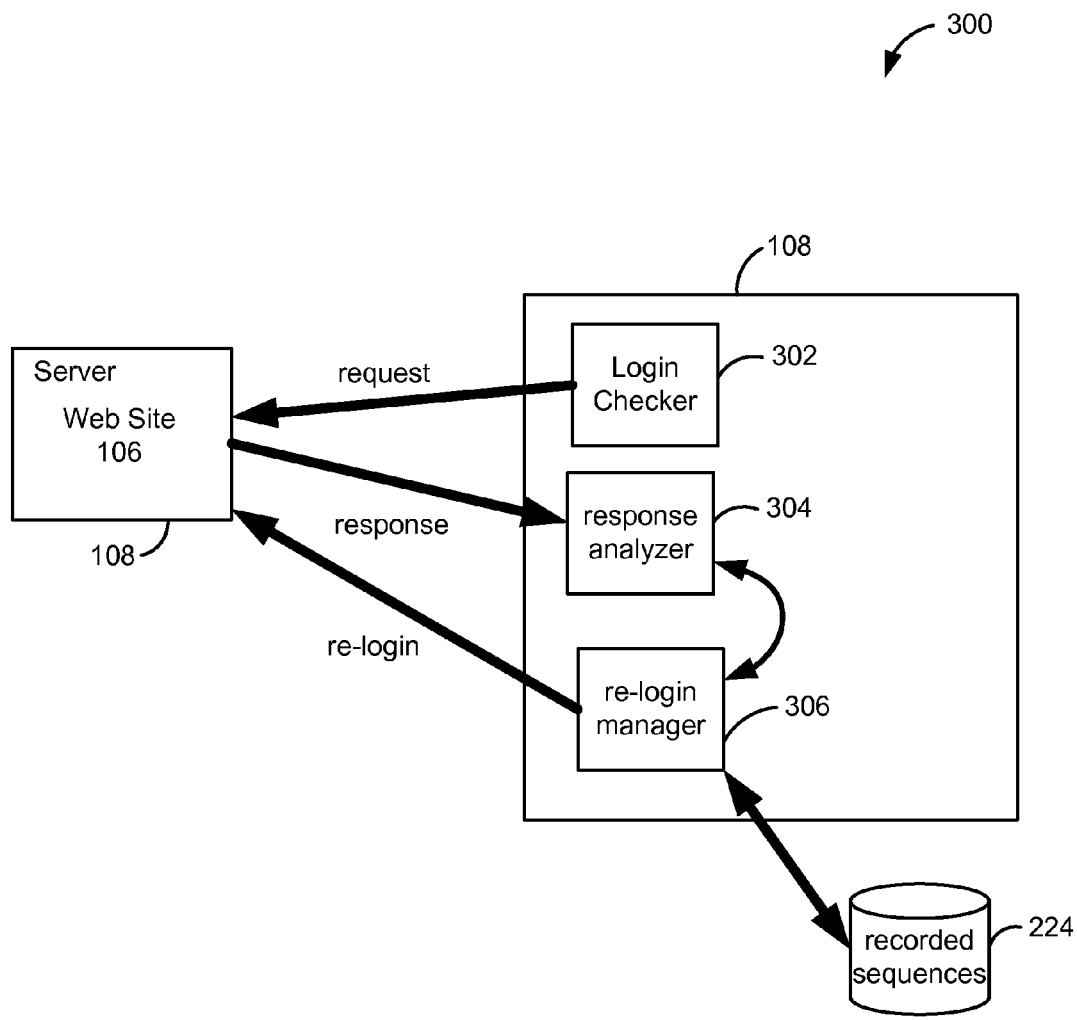
FIG. 3 depicts a system for detecting session state and automatically re-logging into a web site according to one embodiment of the present invention.

FIG. 3 depicts a system 300 for detecting session state and automatically re-logging into a web site 106 according to one embodiment of the present invention.

As shown, login manager 108 includes a login checker 302, a response analyzer 304, and a re-login manager 306, all of which may be implemented in software, hardware, or any combination thereof. Login checker 302 is configured to determine if the session state should be checked. For example, login checker 302 may check session state during certain intervals. Although, at any time during a scan using WASS 102, login checker 302 may check if session state is still valid. This check may be in response to instructions from a user, or any other events that occur, such as an error, a redirection, etc.

Login checker 302 is configured to send a request to web site 106 in order to check session state. In one embodiment, the request is predetermined. For example, the request may be for a login page where credentials are sent for the login page. The credentials may or may not be valid. The request may be denied if session state is invalid or allowed if session state is valid. In one embodiment, the request may be sent using a URL session id or HTTP cookie. An HTTP request may be sent that does not change authentication state but is affected by the state. In one embodiment, a request to view account preferences may be sent because the request is typically denied when valid credential information is not provided.

A server 108 for web site 106 sends a response that is received at response analyzer 304. Response analyzer 304 is configured to analyze the response in order to determine if the session state is still valid. As will be discussed in more detail below, response analyzer 304 may use an algorithm to determine if the response indicates that a session is still valid. For example, for the same request, it may be expected that a first response is received if the session is valid and a second response is received if the session is invalid. If a request for account preferences page is sent with valid credentials, a first page may be returned in the response that includes a user's account preferences. This page may change slightly over time. For example, if a later request is sent for the same account preferences page with valid credentials, a second page that is slightly different than the first page may be provided. This page may include different account preferences because the user may have changed his/her account preferences. Also, a web site owner may have changed the format of the account preferences page and thus the second page is different from the first page. The first and second page, however, are pages that are returned for requests with valid credentials. Accordingly, in one embodiment, a one-to-one request to response analysis may not be used because of the changing nature of responses that are provided for a request. The same may be true if the requests are sent for the account preferences page with invalid credentials. For example, an access denied page may be returned if a session is not valid. This page, however, may be slightly different each time an invalid request is made. As will be described in more detail below, response analyzer 304 may use a fuzzy logic approach in interpreting the response to determine if a session is still valid. Fuzzy logic may be any techniques where a substantially similar match may be determined.

If login checker 302 determines the session is still valid, then login manager 108 does not need to re-login to web site

106. However, if the session is not valid, then re-login manager 306 is configured to automatically re-login to web site 106.

In one embodiment, recorded sequences from database 224 are retrieved. These recorded sequences may have been recorded using the client-side code as described in FIG. 2. Re-login manager 306 uses the recorded sequences and replays them simulating the events had occurred at browser 202 during a login process. In one embodiment, re-login manager 306 may instantiate a browser 202. The sequences are then replayed in the browser, which then sends requests to web site 106. In one embodiment, the recorded sequences may be translated into JavaScript replay code, which simulates the events that occurred during the recording process. These events may then be pushed into the DOM environment of a web page displayed on browser 202. These events, when pushed into the DOM environment, are sent to web site 106 and cause an automatic re-login to web site 106. For example, the events of entering in a username and password and sending them to web site 106 may be simulated and resent to web site 106. This may cause browser 202 to re-login to web site 106.

Login manager 108 may intercept the request sent by browser 202 and then forward them to web site 106. Web site 106 sees the request and provides a response that should provide authentication credentials (e.g., HTTP cookies, etc.). Login manager 108 may record the credentials. These credentials may then be used by WASS 102 in scanning web site 106 (e.g., used to access restricted parts of web site 106). The process of re-logging into web site 106 will be described in more detail below.

As mentioned above, login manager 108 is configured analyze a response to determine if a session state is still valid. Because responses for a request may vary, login manager 108 is configured to determine if responses to a request that may vary indicate if a session is still valid or not. A model may be generated that may be used to determine if response received are associated with a valid or invalid session state.

Figure 4:
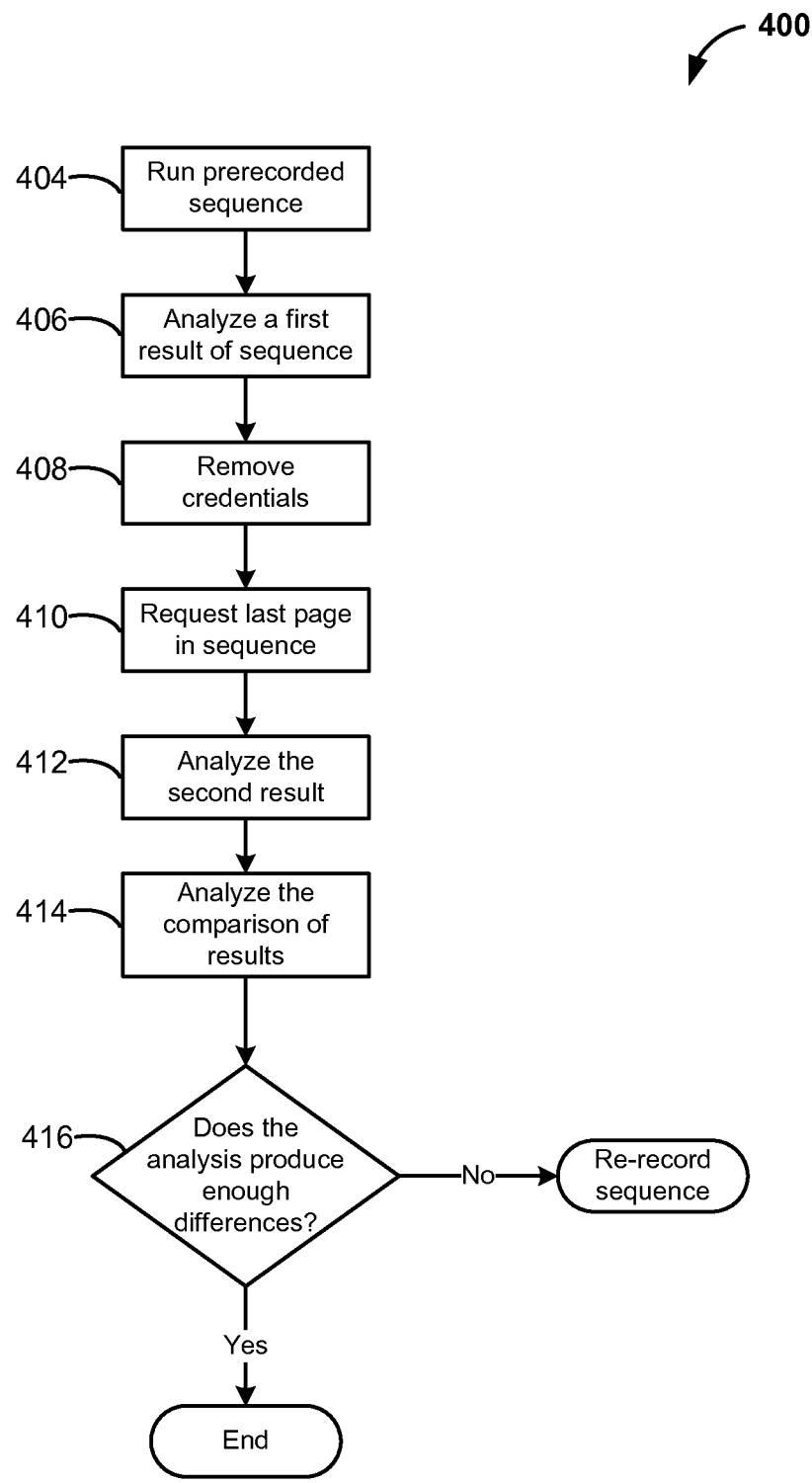
FIG. 4 depicts a simplified flow chart of a method for training of login manager 108 for session detection according to one embodiment of the present invention.

FIG. 4 depicts a simplified flow chart 400 of a method for training of login manager 108 for session detection according to one embodiment of the present invention.

In step 404, a prerecorded sequence is run. This prerecorded sequence may be the sequence that was recorded using the client-side code as described in FIG. 2. This sequence may send requests to a web site 106 from a browser 202. These requests are sent with credentials. Thus, the client is able to successfully login to a web site 106 using the credentials.

In step 406, the results of the sequence are analyzed. For example, a series of requests and responses may be received from running the prerecorded sequence. In one example, a request for a login page may be sent. A response may include the login page. Login information is inserted for the login page. A request is sent with the login information and a response is received. Because it is assumed the login information is correct, the response may be a page that is provided for the correct login information. This response may include credentials. The last request of the recorded sequence may be a request for the page that may be used to analyze if session state is still valid. This may be referred to as a session verification request (SVR). For example, the request may be for a user's account preferences page. The response in this case may be the user's account preferences page because the credentials are valid.

In step 408, the credentials are removed. In this case, a request without the credentials may be sent in step 410. This is to determine which page is returned when a session is invalid. In one embodiment, the last page in a recorded sequence is requested (the SVR).

In step 412, a second response for the SVR is analyzed. Because the credentials are not valid, it is assumed that the page that was returned when the credentials were valid is not returned. For example, the account preferences page will not be returned; rather, an error page or an unauthorized access page may be returned.

In step 414, the first result and the second result are analyzed. In one embodiment, the results are analyzed to determine if there is enough difference between a valid login attempt and an invalid login attempt. For example, it is determined if the account preferences page and the error page include enough different information such that it can be determined if a page for a valid login or a page for an invalid login is returned.

In step 416, it is determined if the analysis produced enough differences. If enough differences are determined between the first and second results, the training is halted. If the analysis does not produce enough differences, a new sequence may be recorded. For example, a different page may be analyzed where requests are sent with credentials and without credentials. The above process may continue until the analysis in step 416 produces enough differences where a response for a valid request and a response for an invalid request can be sufficiently distinguished.

Once the training is finished, a model may be generated based on the differences. For example, if the above process is performed many times for the same recorded sequence, different examples may be generated to model. For example, if different login credentials are used for different users, different responses may be provided for valid and invalid login SVRs. This may provide several examples of what may be expected with known conditions.

When scanning a web site 106, however, it is not known whether session state is valid or invalid. Thus, the known responses in the model are used to determine if the unknown SVR was a valid request or an invalid request. The unknown SVR produces an unknown response, which may then be compared with the known responses to determine which known response is most similar to the unknown response.

For example, a nearest-neighbor match may be calculated using locality-sensitive hashes of the known response and unknown response. The SVR can be placed several times with valid credentials and invalid credentials to generate several examples of what to expect in known conditions. Then when the state is unknown, the SVR is placed and compared with the responses to the known conditions. This nearest-neighbor match can be calculated using many techniques, such as locality-sensitive-hashes of the responses, treated as vectors. This reduces the page similarity match to one of distance calculations in Euclidean space; given a point in the vector space representing current conditions, the LSH vector of the current SVR response, finds the nearest point in the vector space from the training data. To generate the LSH, a feature vector generation algorithm may be used.

In another embodiment, a Bayesian inference, as a fuzzy classification system, may be used to determine if a response from the SVR indicates a session is valid or invalid. A Bayes network may be trained using a sample good response from sending the SVR immediately after running a fresh replay of the sequence, and a sample bad response by modifying the SVR to remove credential information such as Authorization headers and HTTP Cookies. The network may then be used to classify an unknown response as being closest to a known response for a valid session or an invalid session.

Other fuzzy classification systems may be used in order to compare an unknown response to known responses. Also, it will be understood that one-to-one matches may also be performed and may occur. However, the responses may be run through the classification system.

Accordingly, a system for determining if an unknown request is a valid or invalid request is provided. Using the above system may be useful because responses to unknown SVRs may not be clear. There may not be a general rule for how a server 108 will respond to a SVR. Also, other servers 108 may provide different responses for the same SVR. Further, even on the same server 108, responses to the same request may change dynamically. Because of this, the above classification system may be used in order to determine if session state is valid or invalid.

Figure 5:
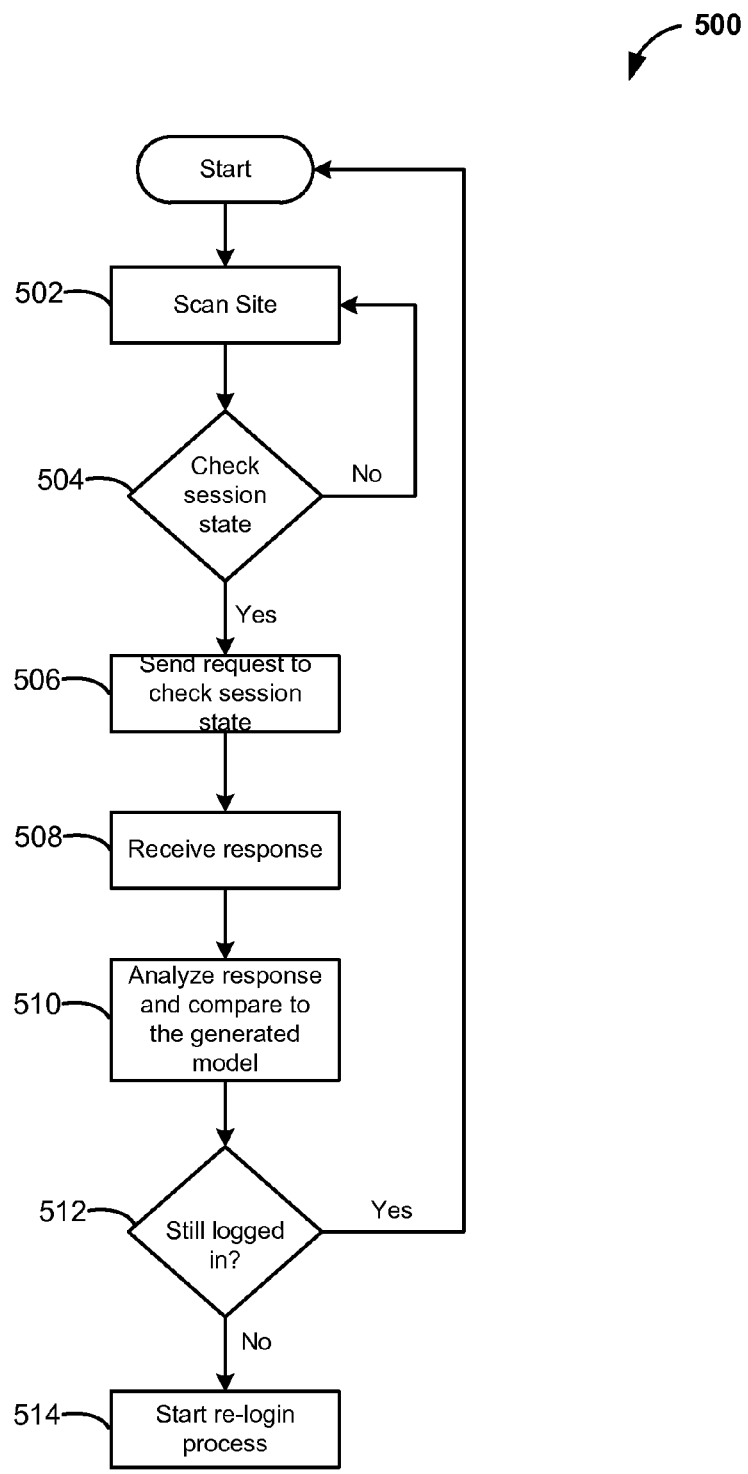
FIG. 5 depicts a simplified flow chart of a method for determining if session state is valid or invalid according to one embodiment of the present invention.

After performing the above training described in FIG. 4, the following process may be used in order to determine if session state is valid or invalid. FIG. 5 depicts a simplified flow chart 500 of a method for determining if session state is valid or invalid according to one embodiment of the present invention. In step 502, a web site 106 is scanned. In step 504, it is determined if a login session state should be checked. If not, the process reiterates to step 502 where the web site 106 continues to be scanned.

If it is determined that the login should be checked, in step 506, a session verification request is sent to check the session state. It may not be known if the request includes valid credentials or invalid credentials. In step 508, a response to the request is received.

In step 510, the response is analyzed and compared to the generated model based on the training sequence. As discussed above, the response is compared to known responses to determine a known response that is similar to the unknown response received. Once a known response is determined, it is known whether the known response was requested using valid credentials or invalid credentials.

In step 512, it is determined if WASS 102 is still logged in. For example, if the known response determined in step 510 is associated with valid credentials, then it assumed that WASS 102 is still logged in. If the known request is associated with invalid credentials, then a re-login process is restarted in step 514.

Figure 6:
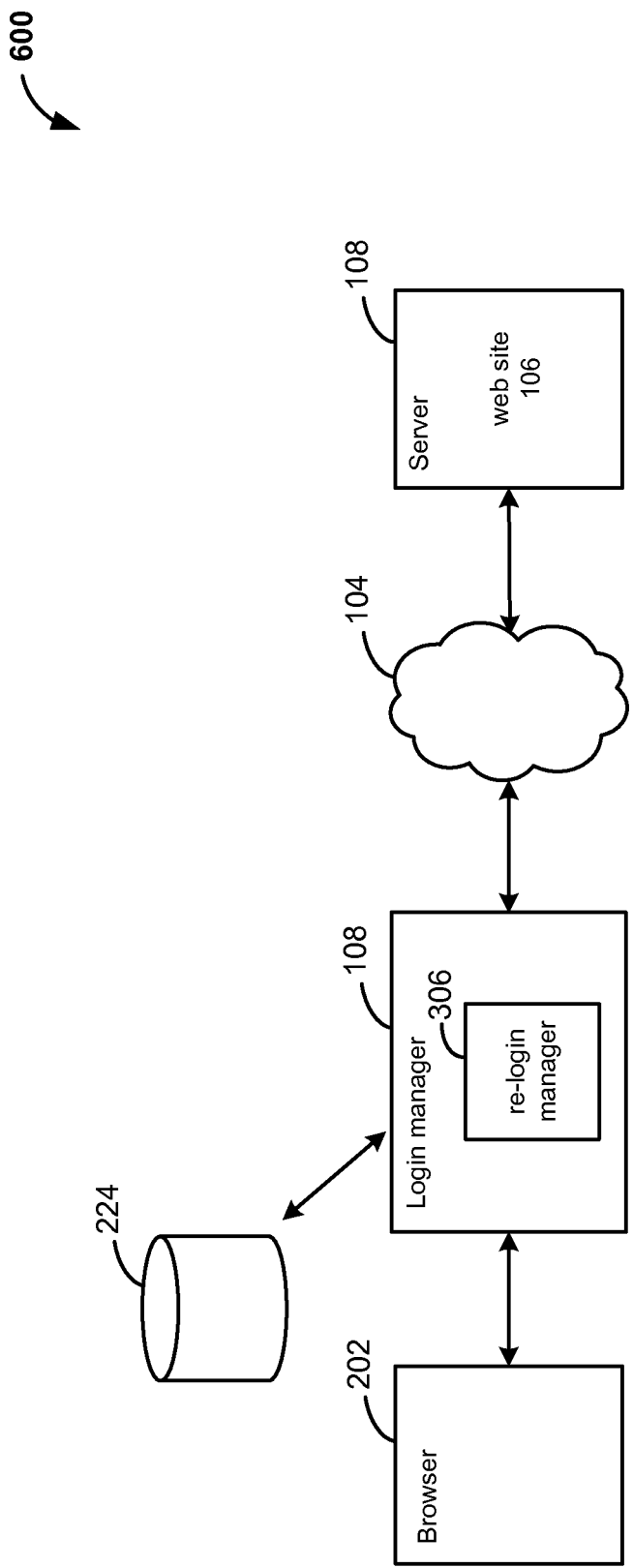
FIG. 6 shows a system for providing the re-login process according to one embodiment of the present invention.

FIG. 6 shows a system 600 for providing the re-login process according to one embodiment of the present invention. As shown, browser 202, login manager 108, network 104 and a server 108 are provided. Login manager 108 retrieves a recorded sequence from database 224. A browser 202 is instantiated and is caused to send a request for web site 106, which is received at server 108.

The request is sent through login manager 108 and intercepted by re-login manager 306. Re-login manager 306 may manipulate the request such that server 108 does not know the request is being automatically sent using a web browser 202 instantiated by login manager 108. The manipulation of the request may include removing user-agent headers and other cache control headers. The request is then sent to server 108.

A response from server 108 is received at re-login manager 306. Re-login manager 306 inserts replay code for the recorded sequence into the response (e.g., the web page). The response is then sent to browser 202. The replay code causes browser 202 to perform events that were recorded in recorded sequence. For example, if a login page is requested, the login page is sent from server 108 through login manager 108 to browser 202. The replay code causes browser 202 to insert a user name and password into a login page and then causes browser 202 to submit another request with the login information.

The login request may be intercepted by re-login manager 306, which may manipulate the request to remove header information, and then the request is sent to server 108. Server 108 sees the request and provides a response that should provide the authentication credentials (e.g., HTTP cookies, etc.).

Re-login manager 306 then may insert replay code into a page of the response and send the response to browser 202. The replay code causes browser 202 to send another request with the credentials. The request is then intercepted at login manager 108 and re-login manager 306 notes the credentials that are sent. The credentials are captured and may be used by WASS 102 for scanning web site 106.

Example

The following provides an example according to one embodiment of the present invention. Suppose it is desired that WASS 102 scans a web site identifier, such as a web site at the uniform resource locator (URL) of www.site.com. The web site may have a login page at HTTP://www.site.com/login.html. A browser 202 is configured to use login manager 108 as a proxy. Login manager 108 can then begin recording a sequence at HTTP://www.site.com/login.html.

The request for this web page is sent to login manager 108, which then forwards the request to a target server 108. A response is returned from server 108 where client side code is inserted into the response by login manager 108. When the code is loaded by browser 202, it causes the browser to record any events, such as clicks, changes, resets, selections, submissions and command events that may occur. The above listed events are not exhaustive, it will be understood that other events may be appreciated by a person skilled in the art.

The code then sends a recorded sequence to login manager 108 at any time. The recorded sequence may be sent to login manager 108 by sending a request to server 108. This avoids the problem of a web browser not allowing client-side code, such as JavaScript, to place requests off domain (i.e., requests that are to other destinations other than www.site.com). Accordingly, the request is sent for web site 106 but may include an extra header that indicates the recorded sequence is included in the request. Login manager 108 is then configured to intercept a request and does not forward it to server 108. The recorded sequence is stored and the request may then be discarded.

Browser 202 may be used to enter in a username and password and any other login information, and then a form is submitted with the information. The events that are recorded may include DOM information such as which target was included, the inputted the input username and password, what was selected, and what was inputted. For example, if the user gives the Username of "someguy", a Password of "mustache", and then submits the form, the event recording for this step may be stored as:

target=,0.2.3.1.1.0.1.0,INPUT
change=someguy
target=,0.2.3.1.1.2.1.0,INPUT
click=130,106
change=mustache
target=,0.2.3.1.1.4.0.0,INPUT
click=45,133
target=,0.2.3,FORM
submit=

The "target" string records where events occurred in the web page and the other lines record what happened at the most recently targeted location. For example, the target at target=,0.2.3.1.1.0.1.0,INPUT is changed to "someguy".

At some other time, the login manager 108 may spawn a browser and replay the recorded sequence. In this case, replay code may be inserted in a response and sent to browser 202. When a page is loaded in browser 202, the replay code selects a target in a document and sets its value to the "someguy" and also selects the target for the password and sets its value to the "mustache". A click event is then simulated in the browser at a submit button. A request with the login information is then sent to the server.

The server sends a response that includes credentials back to browser 202. A final HTTP request is placed by the browser 202. The request includes fresh credentials for the authentication realm and is intercepted by login manager 108. The credentials are then stored.

Re-login manager 306 then releases the web browser instance. The credentials may then be used by WASS 102 while scanning web site 106. For example, requests sent to web site 106 include the credentials. During scanning, however, it is possible that the credentials may become invalid (i.e., the session has ended or is invalid).

WASS 102 may check the session validity when either of two conditions is met in one embodiment. For example, when the credentials are sufficiently old or when a request is placed on a server that has an unknown effect on session state. For example, during a period of time the credentials may become stale and invalid. Also, when a request is placed for a web site that has an unknown effect on session state, WASS 102 may want to check if the session is valid or not. A request that has an unknown effect on session state may be clicking on a logout link, submitting a form or manipulating a URL string.

One example session validity request that may be used to test session state at www.site.com is a request for the page http://www.site.com/private/my_prefs. This page may display a user's account preferences. This may be good target request for session state detection because when credentials are valid, the page returned may present content that allows a user to view and edit account settings. Alternatively, when credentials are not valid, an HTTP redirect to a log-in page may be provided. Thus, differences between the two responses received for a request with and a request without credentials may be determined.

When credentials are valid, the page may present content that allows a user to view and edit account settings. An example of this page may be:
HTTP/1.1 200 OK
Date: Tue, 21 Jun. 2005 19:19:15 GMT
Server: Apache
Last-Modified: Tue, 21 Jun. 2005 19:17:50 GMT
ETag: "107b51-21e-42b867de"
Accept-Ranges: bytes
Content-Length: 542
Connection: close
Content-Type: text/html; charset=iso-8859-1
<html><head><title>Preferences</title></head>
  <body>
  <h1>Preferences</h1>
  <form action="/private/change_prefs.cgi">
    <table>
      <tr><td>Email:</td><td><input name="email"
        value="someguy@somesite.com"></td></tr>
      <tr><td>Phone:</td><td><input name="phone"
        value="555-1212"></td></tr>
      <tr><td>Password:</td><td><input   name="pass"
        type="password"
        value="xxxxxxxx"></td></tr>
    </table>
  </form>
  </body>
</html>

Alternatively, when the credentials are invalid the response may be an HTTP redirect to the log-in page. An example of this page may be:
HTTP/1.1 302 Found
Date: Tue, 21 Jun. 2005 19:42:43 GMT
Server: Apache
Location: http://www.site.com/login.html
Connection: close
Transfer-Encoding: chunked
Content-Type: text/html; charset=iso-8859-1
d2
<!DOCTYPE HTML PUBLIC "-//IETF//DTD HTML 2.0//EN">
<HTML><HEAD>
<TITLE>302 Found</TITLE>
</HEAD><BODY>
<H1>Found</H1>
The document has moved <A HREF="http://www.site.com/login.html">here</A>.<P>
</BODY></HTML>
0

As can be seen, the above two pages are different. The page that is received can be compared with previously received results during a scanning process to determine if the received page is associated with a request with valid or a request with invalid credentials.

The act of requesting using the above SVR does not change the validity of any credentials, but does provide an indicator for the state of the session. In the above case, the meaning of each response may be clear, but there is no general rule for how a server may respond in this context. For example, different servers 108 may provide different redirect pages. Further, account information may change based on the user's account information, date information may change, or the web site format may change. Accordingly, the above process described in FIG. 4 of determining if a request is sent with valid or invalid credentials is used to determine if session state is still valid.

WASS 102 may mark requests that may be made with invalid credentials. When the re-login session occurs and new credentials are determined, these invalid requests may be re-submitted. If HTTP transactions in the marked requests are stateless, then it is safe to place the request that lacked valid session credentials again once a new session has been established. Thus, WASS 102 may recover from session timeouts from inadvertently requesting a session end, and from other session-related errors during a scan by re-logging in and requesting the page again with new credentials.

Accordingly, embodiments of the present invention provide many advantages. For example, a web application security scanner is provided with an automatic re-login process. Thus, when session state is invalid, a WASS 102 may re-login into the site and continue scanning with valid credentials. Further, a WASS is provided with session state detection techniques that allow a WASS to determine if session state is valid. These detection techniques take into account variations in different responses that may be received for a website. Accordingly, the session state detection process may be robust and reliable.

The present invention can be implemented in the form of control logic in software or hardware or a combination of both. The control logic may be stored in an information storage medium as a plurality of instructions adapted to direct an information-processing device to perform a set of steps disclosed in embodiments of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for managing session state during a security scan of the web site, the method comprising:
under the control of one or more computer systems configured with executable instructions,
analyzing a first page received in response to a first request for the first page of the web site that includes executable instructions to determine if a session is valid; and
when the session is not valid:
determining login information for the web site;
causing an interface to send a second request for a login page of the web site;
receiving the login page in response to the second request for the login page of the web site;
causing the interface to send a third request including the login information for the web site, the request for logging into the web site; and
receiving a response for the third request, the response including credential information, the credential information useable to establish a valid session with the web site.

2. The method of claim 1, further comprising:
storing the credentials;
resending the first request using the credentials; and
receiving a second page in response to the request, the second page reflecting the valid session.

3. The method of claim 1, wherein receiving the login page in response to the second request further comprises inserting login code into code for the login page, the login code configured to cause the interface to enter the login information for the login page and configured to cause the interface to send the third request.

4. The method of claim 1, wherein analyzing the first page comprises:
determining a first set of comparison pages, the first set of comparison pages being determined using previous requests for the first page during a valid session;
determining a second set of comparison pages, the second set of comparison pages being determined using previous requests for the first page during an invalid session; and
analyzing the first page based on the first set of comparison pages and the second set of comparison pages to determine a page in the first set or second set that yields a nearest match.

5. The method of claim 4, further comprising:
if the nearest match is a page in the first set, determining that the session is valid; and
if the nearest match is a page in the second set, determining that the session is invalid.

6. The method of claim 1, further comprising recording a sequence of events between the interface and the web site in order to determine the login information, wherein the sequence of events are used to cause the interface to send the third request.

7. The method of claim 6, wherein the sequence of events are recorded using client-side code being run at a client displaying the interface.

* * * * *